July 18, 1967  KAZUO. TSUKAGOSHI  3,331,187
PROCESS OF GAS ABSORPTION
Filed Nov. 27, 1963

United States Patent Office 3,331,187
Patented July 18, 1967

3,331,187
PROCESS OF GAS ABSORPTION
Kazuo Tsukagoshi, Tokyo, Japan, assignor to Ebara-Infilco Kabushiki Kaisha, Tokyo, Japan, a corporation of Japan
Filed Nov. 27, 1963, Ser. No. 326,564
2 Claims. (Cl. 55—21)

The present invention relates to a process for dissolving or absorbing air or gas mixtures under pressure in a liquid or suspension containing fine solid particles.

An object of the present invention is to provide an economical process for dissolving or absorbing gas under pressure in a liquid.

In the case in which a soluble gas component in gases dissolved or absorbed under presure in a liquid has a bad effect on the purity of the product obtained through said process, the present invention contemplates the provision of a process for reducing such bad influences to a great extent.

A process for using a gas-by-liquid ejector or other equipment is well known as a method for absorbing gas in a liquid. In case of applying any process, the dissolution or absorption are more easily carried out by the turbulent flow of gas and liquid and, moreover, gas absorption is very effectively performed if a difference between the gas concentration in the liquid and that in the liquid film is large. For this reason, it is economical to feed excess gas beyond the amount of gas to be dissolved or absorbed, so a compressing treatment is applied.

If an extreme quantity of excess air or gas beyond that actually dissolved or absorbed is always supplied and discharged, the expense of construction and motive power is very large. Besides, in the case in which a gas component in the supplied gases has a bad effect on the purity of the absorbing liquid, such bad effect is increased by said process.

Figure 1:
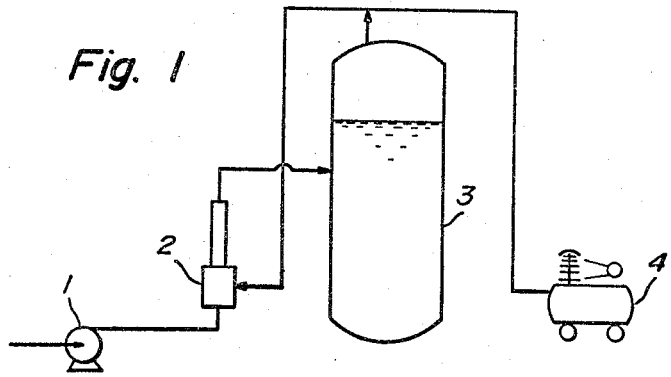
Figure 2:
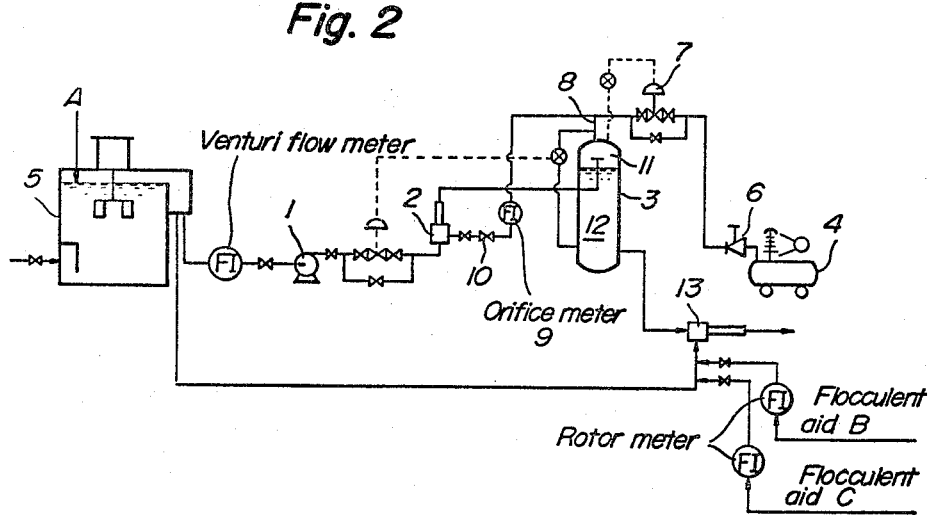

The present invention seeks to overcome the above deficiencies. This will become apparent from a consideration of the invention given in detail with reference to the attached drawings, wherein:

FIGURE 1 is a diagrammatic illustration of gas absorption apparatus according to the invention; and
FIGURE 2 is a diagrammatic illustration showing the gas absorption apparatus of FIG. 1 in an overall process.

In FIG. 1 of the drawing when water or liquid passes through a gas-by-liquid ejector 2 in case of being supplied to a gas dissolution tank or separation tank 3 by a pump 1, the excess gas from the gas-dissolution tank or separation tank 3 and newly supplied compressed gas are fed to the ejector 2, and gas absorption is carried out more easily by the continuous turbulent flow of gas and liquid. Then, while gas absorption is still further increased in the gas-dissolution tank or separation tank 3, the excess gas is retained in the top of the tank and a gas-dissolved liquid in the liquid phase is discharged externally of the system. The excess gas retained in the top of the tank is fed to the ejector 2.

As described above, a nearly constant amount of excess gas is circulated in the process of the present invention, so the gas to be almost equivalent to the net amount of dissolved gas in the liquid which is discharged to the outside of the system is only required as the amount of the newly supplied compressed gas. Therefore, in a case in which a compressor 4 is required for gas compression, it is economical that the required capacity is approximately equivalent to the amount of dissolved gas per unit time.

In the presence of an undesirable gas component in the dissolved gases, where is, in a case that a certain gas component of the dissolved gases reacts with another component contained originally in the liquid to form a reaction byproduct which lowers the purity of the final product, the only amount of newly supplied compressed gas required is about equivalent to the amount of gas dissolved in the liquid which is discharged outside the system. Therefore, the amount of undesirable gas component is extremely small, so that purity of the product becomes very high.

Example

In the case of applying flotation to a process of separation of the solid fine particles of $Mg(OH)_2$ from the mother liquor in a process for producing MgO clinker from sea water, it is required as a pretreatment that after the compressed air is dissolved into a part of $Mg(OH)_2$ reaction liquid, air bubbles generated by means of pressure reduction of the reaction liquid are made to cling to the fine particles of $Mg(OH)_2$ in the reaction liquid. The process for dissolving air in a part of the reaction solution under pressure was successfully carried out by applying the present invention, which is described below.

The pH of the liquid in a reaction tank was maintained from 10.2 to 10.3 at room temperature, and decarbonated sea water was charged in the tank and, at the same time, slaked lime slurry was supplied into it. After the reaction was carried out for 20 minutes, the reacted liquid of $Mg(OH)_2$ was continuously taken out. 1.02 g. of $Mg^{++}$ out of 1.2 g. $Mg^{++}$ contained in 1 l. of the decarbonated sea water reacted with $OH^-$ in the slaked lime slurry to form 2.45 g. of $Mg(OH)_2$ and 0.18 g. of $Mg^{++}$ was retained in order to get the best purity. In a pilot plant as shown in FIG. 2, $Mg(OH)_2$ slurry was supplied at the rate of 50 kg./min. to a raw liquid stirring tank 5 and mixed thoroughly with a dilute soap solution of 0.2% in concentration as surfactant charged at the rate of 16 kg./hour. Then, 27% that is, 13.6 kg./min. of this mixture was passed through the nozzle of a gas-liquid ejector 2 by a pressurizing pump 1. Air is discharged at the rate of 0.544 l.-N.T.P./min. under an outlet pressure of 4.5 to 5.0 kg./cm.$^2$-G from a reducing valve 6 of an air compressor 4 and was controlled to 4 kg./cm.$^2$-G by a pressure control valve 7, fed in a T-shaped tube at the top of an air dissolution tank 3, and mixed with excess air passing through the air discharging tube 8 of the dissolution tank at 0.952 l.-N.T.P./min., to become 1.496 l.-N.T.P./min. at the T-shaped tube. The flow rate of the gas mixture was controlled by manual operation with an orifice flow meter 9 and a needle valve 10 and the gas mixture was sucked in the suction chamber of the gas-liquid ejector 2. This gas mixture accompanied with the driving liquid passing through the throat and diffuser of the ejector was charged in the air dissolution tank 3, and retained in it for 1 minute as liquid retention time, so that the air was sufficiently dissolved into the $Mg(OH)_2$ reaction liquor. The interior of the air dissolution tank 3 consists of two phases, gas phase 11 and liquid phase 12, and the excess air was retained in the gas phase 11. The boundary surface of gas and liquid was controlled at constant height by a level regulator. By detecting the pressure of 4 kg./cm.$^2$-G of the gas phase, the amount of air equivalent to 0.544 l.-N.T.P./min. thereof dissolved into 13.6 kg./min. of the compressed air dissolved liquid was fed by compressor 4. 0.544 l.-N.T.P./min. of the air became fine bubbles at the outlet of the nozzle of a liq.-liq. ejector 13 and quickly clung not only to the fine particles of $Mg(OH)_2$ in the pressurized liquid (whose pressure was rapidly reduced to nearly normal pressure as soon as it was discharged from the nozzle) but also $Mg(OH)_2$ fine particles in 36.7 kg./min. of non-pressurized liquid (which spontaneously flowed and in which two kinds of flocculant aid such as acrylamide polymer and polyamine were added each as a liquid 4.2 kg./h. of 0.02% concentration in front of the suction side of the liq.-liq. ejector 13). When those fine particles to which fine bubbles were made cling was treated by flotation, the yield of $Mg(OH)_2$ was 90–95%.

In said process, dissolved $CO_2$ in the compressed air dissolved liquid reacts with $Ca^{++}$ in the liquid to form $CaCO_3$. It is changed to CaO by incinerating cake of $Mg(OH)_2$ and this CaO has a bad effect on the purity in MgO clinker, so it is desirable that the $CO_2$ content is as small as possible.

In an excess air recycle system according to the present invention, the dissolved $CO_2$ is 0.163 cc./min., while it is 0.449 cc./min. in the conventional excess air discharge system. Therefore, the process of the present process is very superior to the conventional one.

In comparison with the capacity of the air compressor, in the case of employing three times capacity for the actual gas feeding amount, it is 2.8 l.-N.T.P./min. x 8 kg./cm.$^2$-G in the excess air recycle system according to the present invention and 75 l.-N.T.P./min. x 8 kg./cm.$^2$-G in the conventional air discharge system. The former is economically superior as shown in Table 3.

Next, said pilot plant was scaled up and a plant of large scale was constructed to treat the reaction liquid of $Mg(OH)_2$ at the rate of 1556 t./h. The dimensions of the component equipment directly relating to the present invention, the operating conditions, and the results are compared with those of said pilot plant in Tables 1, 2 and 3.

TABLE 1

| Equipment | Plant | |
|---|---|---|
| | Pilot plant | Large scale plant |
| Raw liquid stirring tank | 0.55 m$\phi$ x 0.9mH x 0.1 kw. x 1 unit. | 4.35 m x 4.4 mH x 3.7 kw. x 1 unit. |
| Pressurizing | 20 l./min. x 55mH x 1450 r.p.m. x 1.5 kw. x 1 unit. | 7.5m.$^3$/min. x 60 mH x 1450 r.p.m. x 110 kw. x 1 unit. |
| Gas-liq. ejector | Nozzle dia. 3.5 mm$\phi$ x 1 unit. | Nozzle dia. 20 mm$\phi$ x 7 ea./unit x 4 units. |
| Air compressor | 2.8 l.-P.D./min. x 8 kg./cm.$^2$-G. | 1.5 m.$^3$-P.D./min. x 8 kg./cm.$^2$-G x 7.5 kw. x min. 1 unit. |
| Air dissolution tank | 0.38 m$\phi$ x 0.65 mL x 1 unit | 1.2 m$\phi$ x 3.1 mL x 1 unit. |

TABLE 2

| Item | Large scale plant | Pilot plant |
|---|---|---|
| (1) Raw liquid [$Mg(OH)_2$ slurry]. | 1556 T/H = 26 T./min | 3 T./H. = 50 kg./min. |
| (2) Chemical feeding: | | |
| Feeding point: | | |
| Soap solution | Raw liquid stirring tank | Raw liquid stirring tank. |
| Acrylamide polymer (Separan; Dow chemical). | Inlet of non-compressed liquid (spontaneous flow) of liq.-liq. ejectors). | Inlet of non-compressed liquid (spontaneous flow) of liq.-liq. ejector. |
| Polyamine (Konan Flock). | ----do---- | Do. |
| Feeding rate: | | |
| Soap solution | 0.2% liq. 6 T./H | 0.2% liq. 16 kg./H. |
| Acrylamide Polymer. | 0.02% liq. 1.6 T./H | 0.02% liq. 4.2 kg./H. |
| Polyamine | 0.02% liq. 1.6 T./H | 0.02% liq. 4.2 kg./H. |
| (3) Compressing ratio = (compressing liquid/compressed liquid) (100%). | 27% | 27%. |
| (4) Air blowing: | | |
| Excess air treatment | Recycle | Recycle. |
| Air solution tank: retention time at liq. phase | 1 min | 1 min. |
| Vol. of gas phase/Vol. of liq. phase. | 0.2 | 0.3. |
| Air pressure | 4 kg./cm.$^2$-G | 4 kg./cm.$^2$-G. |
| (5) P.R.C. (Pressure Recording Control): | | |
| Pressure indicator | Burdon tube | Burdon tube. |
| Pressure recording meter. | Miniatured all transistor system automatic balance type. | Miniatured all transistor system automatic balance type. |
| Regulator | PI operation | PI operation. |
| Control valve | Single valve ½" | Single valve ½". |
| (6) L.R.C. (Level Recording Control): | | |
| Flow recording meter | All transistor system automatic balance type. | All transistor system automatic balance type. |
| Actuation of liquor level. | Volumetric Filled Pressure sensing heads. | Volumetric Filled Pressure sensing heads. |
| Regulator | PI operation | PI operation. |
| Control valve | 300mm$\phi$ butterfly valve | 1". |
| (7) Air compressor: | | |
| Press. of air tank | 6.5-7.5 kg./cm.$^2$-G | 6.5-7.5 kg./cm.$^2$-G. |
| Outlet press of reduce valve. | 5.5 kg./cm.$^2$-G | 5 kg./cm.$^2$-G. |
| (8) Gas-liq. ejector: | | |
| Compressed slurry | 7.45 T./min | 13.6 kg./min. |
| Outlet pressure of pressurizing pump. | 6.3 kg./cm.$^2$-G | 5.7 kg./cm.$^2$-G. |
| Driving pressure of compressed liquid. | 5.5 kg./cm.$^2$-G | 4.5 kg./cm.$^2$-G. |
| Feed air | 0.82 m.$^3$-N.T.P./min | 1.5 l.-N.T.P./min. |
| Discharged slurry | 7.45 T./min | 13.6 kg./min. |
| Discharging pressure | 4.6 kg./cm.$^2$-G | 4.3 kg./cm.$^2$-G. |
| Ratio of feed air = Feed air/Compressed slurry. | 0.11 l.-N.T.P./l.-Compressed slurry. | 0.11 l.-N.T.P./l.-Compressed slurry. |

TABLE 3

| Plant | Compressed liquid volume | Excess air treatment | Feed air | Dissolved air | Dissolved $CO_2$ | Air compressor |
|---|---|---|---|---|---|---|
| Pilot | 13.6 kg./min | Discharge | 1.496 l.-N.T.P./min | 0.544 l.-N.T.P./min | 0.449 CC-N.T.P./min | 7.5 l.-P.D./min. x 8 kg./cm.$^2$-G.* |
|  |  | Recycle | 0.544 l.-N.T.P./min | 0.544 l.-N.T.P./min | 0.163 CC-N.T.P./min | 2.8 l.-P.D./min. x 8 kg./cm.$^2$-G.* |
| Large scale. | 7.45 T./min | Discharge | 0.82 m.$^3$-N.T.P./min | 0.298 m.$^3$-N.T.P./min | 0.246 l.-N.T.P./min | 4.1 m.$^3$-P.D./min. x 8 kg./cm.$^2$-G. |
|  |  | Recycle | 0.298 m.$^3$-N.T.P./min | 0.298 m.$^3$-N.T.P./min | 0.089 l.-N.T.P./min | 1.5 m.$^3$-P.D./min. x 8 kg./cm.$^2$-G. |

*186 l.-P.D./min. x 5.5 kg./cm.$^2$-G. x 0.75 kw. was used for the experiment.

What I claim is:

1. A process for gas absorption wherein a compressed gas is to be absorbed in a liquid or suspension, said process comprising mixing the liquid or suspension and gas in a gas-liquid ejector, wherein the liquid or suspension sucks the gas and effects mixing therewith and discharges the resulting mixture to a gas dissolution tank wherein a liquid phase and a gas phase are formed, maintaining the liquid in the gas dissolution tank at a constant level, supplying compressed gas to the ejector in an amount approximately equal to the net amount of absorbed gas by detecting the gas pressure in the gas dissolution tank, and circulating the unabsorbed excess gas for reuse together with the compressed gas thus supplied.

2. A process as claimed in claim 1 wherein the unabsorbed gas is circulated along a closed path from the dissolution tank to the ejector and back to the tank, and the liquid with absorbed gas is removed from the tank.

References Cited

UNITED STATES PATENTS 1,209,490   12/1916   Pindstofte.
1,255,018   1/1918   Jones _____ 55—21

FOREIGN PATENTS 893,642   4/1962   Great Britain.

MORRIS O. WOLK, *Primary Examiner.*

MICHAEL E. ROGERS, *Examiner.*